US012582200B2

(12) United States Patent
Zhao et al.

(10) Patent No.: US 12,582,200 B2
(45) Date of Patent: Mar. 24, 2026

(54) WEAVING SHOE UPPERS WITH ELASTIC STRINGS

(71) Applicant: Fujian Xiduo New Material Co., Ltd., Quanzhou (CN)

(72) Inventors: Xuetao Zhao, Quanzhou (CN); Shuanghong Zhu, Quanzhou (CN); Jiaming Su, Quanzhou (CN); Huanhuan Chen, Quanzhou (CN); Qiumei He, Quanzhou (CN); Shunming Zhuang, Quanzhou (CN); Yuanhe Xu, Quanzhou (CN); Yanbing He, Quanzhou (CN); Dan Xu, Quanzhou (CN); Kuidong Ma, Quanzhou (CN); Shengkui Yan, Quanzhou (CN); Xiuyun Jiang, Quanzhou (CN)

(73) Assignee: Fujian Xiduo New Material Co., Ltd., Quanzhou (CN)

( * ) Notice: Subject to any disclaimer, the term of this patent is extended or adjusted under 35 U.S.C. 154(b) by 162 days.

(21) Appl. No.: 18/651,506

(22) Filed: Apr. 30, 2024

(65) Prior Publication Data

US 2025/0331608 A1 Oct. 30, 2025

(51) Int. Cl.
| | |
|---|---|
| *A43B 23/02* | (2006.01) |
| *B32B 5/02* | (2006.01) |
| *B32B 5/26* | (2006.01) |
| *B32B 7/02* | (2019.01) |
| *B32B 7/023* | (2019.01) |
| *B32B 7/09* | (2019.01) |
| *B32B 38/00* | (2006.01) |

(52) U.S. Cl.
CPC .......... *A43B 23/026* (2013.01); *A43B 23/025* (2013.01); *B32B 5/024* (2013.01); *B32B 5/262* (2021.05); *B32B 7/02* (2013.01); *B32B 7/023* (2019.01); *B32B 7/09* (2019.01); *B32B 38/0036* (2013.01); *B32B 2305/18* (2013.01); *B32B 2307/7166* (2013.01); *B32B 2437/02* (2013.01)

(58) Field of Classification Search
CPC .................................................... A43B 23/026
See application file for complete search history.

(56) References Cited

U.S. PATENT DOCUMENTS

| | | | | |
|---|---|---|---|---|
| 4,612,228 | A | * | 9/1986 | Kato .................. D04H 1/43838 |
| | | | | 442/407 |
| 2005/0284560 | A1 | * | 12/2005 | Chuang .................... B32B 5/24 |
| | | | | 156/305 |
| 2019/0216174 | A1 | * | 7/2019 | O'Haire .................. D04C 1/06 |
| 2021/0002798 | A1 | * | 1/2021 | Soster .................... D03D 15/56 |
| 2021/0277543 | A1 | * | 9/2021 | Yao ........................ D02G 3/406 |

* cited by examiner

*Primary Examiner* — Andrew T Piziali

(57) ABSTRACT

The object of the present disclosure is to address the shortcomings in the prior art by providing a novel weaving shoe upper with elastic strings, aiming to offer a structure that is simple and provides good breathability. The shoe upper includes a water-soluble fabric base layer and at least one thermoplastic elastic-string layer with thermoplastic elastic strings wound back and forth on the water-soluble fabric base layer. Each of the thermoplastic elastic strings is heat-pressed and bonded at the intersection or overlap points between thermoplastic elastic strings.

5 Claims, 2 Drawing Sheets

WEAVING SHOE UPPERS WITH ELASTIC STRINGS

FIELD OF THE DISCLOSURE

This disclosure relates to the field of shoe uppers technology, specifically to a novel weaving shoe upper with elastic strings.

BACKGROUND OF THE DISCLOSURE

Flyknit, jacquard, or woven shoe uppers are commonly used in the market. Traditional shoe uppers are woven with warp and weft threads at a 90° perpendicular angle during manufacturing. However, this weaving method lacks sufficient breathability, resulting in inadequate overall ventilation of the shoe uppers and discomfort for the wearer due to their thickness. To address this issue, the present disclosure has been developed.

SUMMARY OF THE DISCLOSURE

The purpose of the present disclosure is to address the shortcomings and deficiencies in the prior art by providing a novel weaving shoe upper with simple structure and improved breathability.

To achieve the above object, the present disclosure adopts the following technical solution: a novel weaving shoe upper with elastic strings, including a water-soluble fabric base layer, and at least one thermoplastic elastic-string layer with thermoplastic elastic strings wound back and forth above the water-soluble fabric base layer; each of the thermoplastic elastic strings is heat-pressed and bonded at intersection points or overlap points.

Preferably, the thermoplastic elastic strings are arranged to intersect or run parallel on the water-soluble fabric base layer, with each of the thermoplastic elastic strings secured to the water-soluble fabric base layer using water-soluble threads.

Preferably, two ends of each water-soluble thread are located on the water-soluble fabric base layer and cross over the thermoplastic elastic strings; each of the thermoplastic elastic strings is located between the water-soluble threads and the water-soluble fabric base layer.

Preferably, thermoplastic elastic strings with at least one color are custom-wound on a middle layer or upper layer of the thermoplastic elastic-string layer to form an image layer customized by users.

Preferably, the image layer is a continuous single pattern or a discontinuous pattern formed by modularization with different parameters.

Preferably, the thermoplastic elastic string is formed by a core and a thermoplastic elastic elastomer wrapped around an outer surface of the core.

Preferably, the thermoplastic elastic elastomer is polyurethane thermoplastic elastomer, polyester thermoplastic elastomer, polyamide thermoplastic elastomer, or polyethylene (PE) thermoplastic elastomer.

Preferably, the thermoplastic elastic elastomer is a blend of polyurethane, polyester, polyamide, polyethylene, or a combination of any two or more materials thereof in any mixing ratio.

Preferably, the core is a yarn core or a polymer core composed of a blend of polyester, nylon, ultra-high molecular weight polyethylene, carbon fiber, carbon filament, fiberglass, or a combination of any one or more materials thereof in any mixing ratio.

With the utilization of the above technical solutions, the present disclosure provides the following beneficial effects:

1. Simple structure and improved breathability: The shoe upper is woven with thermoplastic elastic strings, allowing for the creation of ventilation holes at the intersections, thereby achieving comprehensive ventilation of the shoe upper and enhancing breathability.

2. Convenient manufacturing: By arranging thermoplastic elastic strings on the water-soluble fabric base layer and then sewing them in place with water-soluble threads, manufacturing is not only convenient but also efficient, facilitating production.

3. Easy removal: The use of water-soluble fabric base layer as a carrier and water-soluble threads for positioning the thermoplastic elastic strings enables easy detachment of the fabric base layer and threads from the shoe upper after heat pressing. Simply dissolving them in water facilitates removal, making it convenient for operators.

DETAILED DESCRIPTION OF THE DISCLOSURE

Below, in conjunction with the drawings and embodiments, a further description of specific embodiments of the present disclosure is provided. The following embodiments are for the purpose of illustrating the technical solution of the present disclosure more clearly and should not be construed to limit the scope of the present disclosure.

Figure 1:
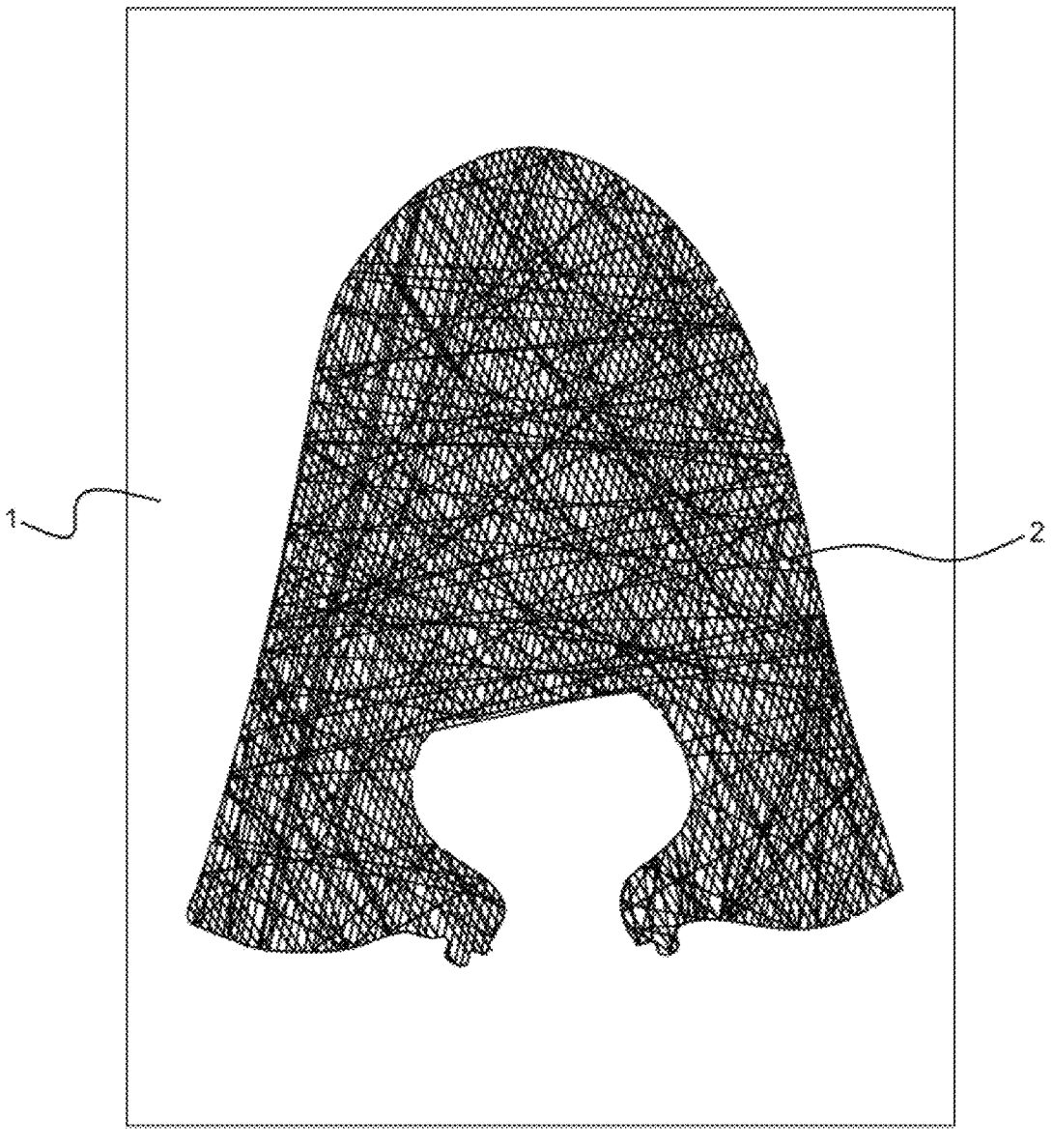
FIG. 1 illustrates a schematic diagram of a novel weaving shoe upper with elastic strings according to one embodiment of the present disclosure.
Figure 2:
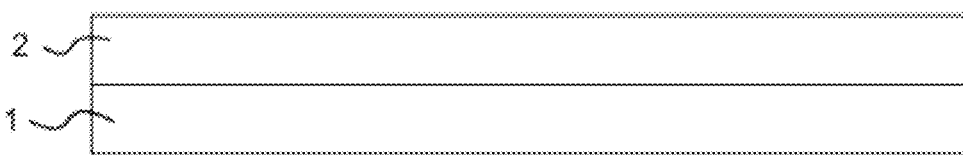
FIG. 2 illustrates a schematic diagram of the novel weaving shoe upper with elastic strings according to one embodiment of the present disclosure, shown in a sectional view.
Figure 3:
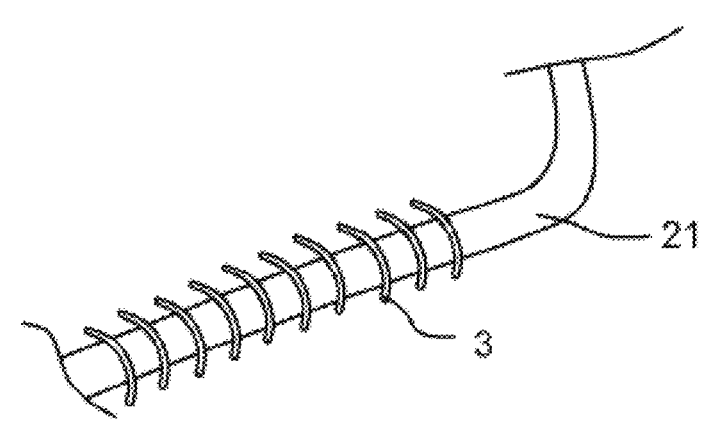
FIG. 3 illustrates a schematic diagram of the water-soluble threads and the thermoplastic elastic strings according to one embodiment of the present disclosure.

As shown in FIGS. 1-3, a novel weaving shoe upper with elastic strings includes a water-soluble fabric base layer 1 and at least one thermoplastic elastic-string layer 2 with thermoplastic elastic strings wound back and forth above the water-soluble fabric base layer 1. Each of the thermoplastic elastic strings 21 is heat-pressed and bonded at intersection points or overlap points of the thermoplastic elastic strings.

Specifically, the thermoplastic elastic strings 21 are arranged to intersect or run parallel on the water-soluble fabric base layer 1, with each of the thermoplastic elastic strings 21 secured to the water-soluble fabric base layer 1 using water-soluble threads 3. Two ends of each water-soluble thread 3 are positioned on the water-soluble fabric base layer 1 and cross over the thermoplastic elastic strings 21. Each of the thermoplastic elastic strings 21 is located between the water-soluble threads 3 and the water-soluble fabric base layer 1.

The thermoplastic elastic strings 21 is formed by a core and a thermoplastic elastic elastomer wrapped around an outer surface of the core. The core can be a yarn core or a polymer core composed of a blend of polyester, nylon, ultra-high molecular weight polyethylene, carbon fiber, carbon filament, fiberglass, or a combination of any one or more materials thereof in any mixing ratio. The thermoplastic elastic elastomer may be polyurethane thermoplastic elastomer, polyester thermoplastic elastomer, polyamide thermoplastic elastomer, or polyethylene (PE) thermoplastic elastomer. The use of thermoplastic elastic strings 21 to weave the shoe upper enables the creation of ventilation holes at the intersections, achieving comprehensive ventilation and improving breathability. By arranging thermoplastic elastic strings 21 on the water-soluble fabric base layer 1 and then sewing them in place with water-soluble threads 3, manufacturing is convenient, efficient, and facilitates production. Using the water-soluble fabric base layer 1 as a carrier and water-soluble threads 3 for positioning the thermoplastic elastic strings 21 enables easy detachment of the fabric base layer 1 and threads 3 from the shoe upper after heat pressing. Simply dissolving them in water facilitates removal, making it convenient for operators.

1. For aesthetic enhancement and customization of patterns according to user requirements, the top layer of the thermoplastic elastic-string layers 2 utilizes thermoplastic elastic strings (21), having at least one color, wound to form a user-customized image layer. The image layer may be a continuous single pattern or a discontinuous pattern formed by modularization with different parameters.

Based on the above solution, the thermoplastic elastic elastomer in this embodiment may also be a blend of polyurethane, polyester, polyamide, polyethylene, or a combination of any two or more materials thereof in any mixing ratio.

The above description and illustration have shown the basic principles, main features, and advantages of the present disclosure. Those skilled in the art should understand that the present disclosure is not limited to the above embodiments. The embodiments and descriptions described above are for illustrating the principles of the present disclosure. Without departing from the spirit and scope of the present disclosure, various changes and improvements may be made. These changes and improvements fall within the scope of the present disclosure as defined by the appended claims and their equivalents. Any undisclosed aspects of the present disclosure are known to those skilled in the art.

4

What is claimed is:

1. A novel weaving shoe upper with elastic strings, comprising:
 a water-soluble fabric base layer,
 at least one thermoplastic elastic-string layer with thermoplastic elastic strings wound back and forth above the water-soluble fabric base layer;
 each of the thermoplastic elastic strings is heat-pressed and bonded at intersection points or overlap points of the thermoplastic elastic strings;
 wherein the thermoplastic elastic strings are arranged to intersect or run parallel on the water-soluble fabric base layer;
 each of the thermoplastic elastic strings is secured to the water-soluble fabric base layer using water-soluble threads.

2. The novel weaving shoe upper with elastic strings according to claim 1, wherein two ends of each water-soluble thread are located on the water-soluble fabric base layer and cross over the thermoplastic elastic strings; each of the thermoplastic elastic strings is located between the water-soluble threads and the water-soluble fabric base layer.

3. The novel weaving shoe upper with elastic strings according to claim 1, wherein the thermoplastic elastic strings, having at least one color of, is wound on a middle or upper layer of the thermoplastic elastic-string layer to form an image layer customized by users.

4. The novel weaving shoe upper with elastic strings according to claim 3, wherein the image layer is a continuous single pattern or a discontinuous pattern formed by modularization with different parameters.

5. The novel weaving shoe upper with elastic strings according to claim 1, wherein the thermoplastic elastic string comprises a core and a thermoplastic elastic elastomer wrapped around an outer surface of the core.

* * * * *